United States Patent
Chen et al.

(10) Patent No.: US 11,813,709 B2
(45) Date of Patent: Nov. 14, 2023

(54) SYMMETRICAL THREE-AXIS PARALLEL SPINDLE HEAD CAPABLE OF MULTI-DIRECTIONAL FIXED-POINT ROTATION

(71) Applicant: Yanshan University, Qinhuangdao (CN)

(72) Inventors: Ziming Chen, Qinhuangdao (CN); Kun Zhao, Qinhuangdao (CN); Wenjiang Yan, Qinhuangdao (CN); Xuechan Chen, Qinhuangdao (CN); Chen Zhao, Qinhuangdao (CN); Zongguo Xu, Qinhuangdao (CN); Haijiao Jia, Qinhuangdao (CN); Zixuan Liu, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 503 days.

(21) Appl. No.: 17/190,531

(22) Filed: Mar. 3, 2021

(65) Prior Publication Data
US 2021/0220953 A1   Jul. 22, 2021

Related U.S. Application Data

(63) Continuation of application No. PCT/CN2018/113544, filed on Nov. 2, 2018.

(30) Foreign Application Priority Data

Sep. 26, 2018   (CN) .......................... 201811122852.2

(51) Int. Cl.
  *B23C 1/12*  (2006.01)
  *B23Q 1/54*  (2006.01)

(52) U.S. Cl.
  CPC .............. *B23Q 1/5462* (2013.01); *B23C 1/12* (2013.01); *Y10T 409/308512* (2015.01); *Y10T 409/309576* (2015.01)

(58) Field of Classification Search
  CPC .............. B23Q 1/5462; B23Q 17/0266; Y10T 74/20305–20366; Y10T 409/307672;
  (Continued)

(56) References Cited

U.S. PATENT DOCUMENTS 4,819,496 A * 4/1989 Shelef .................. B25J 17/0216
                                                       901/29
6,301,525 B1 * 10/2001 Neumann .............. G05B 19/37
                                                       700/254

(Continued)

FOREIGN PATENT DOCUMENTS

CN      1267581 A     9/2000
CN      1986148 A     6/2007
(Continued)

OTHER PUBLICATIONS

Machine Translation of CN 102490177 A, which CN '177 was published Jun. 2012.*

(Continued)

*Primary Examiner* — Erica E Cadugan
(74) *Attorney, Agent, or Firm* — IPRO, PLLC

(57) ABSTRACT

A symmetrical tri-axial parallel spindle head capable of multi-directional fixed-point rotation, comprising three branch chains (2), a moving base (5), and a fixed base (1). A machining spindle (6) is fixedly connected onto the moving base (5). Each of the branch chains (2) comprises a servo motor (22), a branch chain rod (21), a lead screw (23), and a guide nut (25). The lead screw (23) and a linear guide rail (24) are provided in an inner cavity on one end of the branch chain rod (21). One end of the lead screw (23) is (Continued)

connected to the servo motor (22), the lead screw (23) passes through the guide nut (25), and the other end of the lead screw (22) is connected to the branch chain rod (21) by means a rotating pair. The guide nut (25) is mounted on the linear guide rail (24) and is rotatably connected to the fixed base (1) through a first support disc (26). The other end of the branch chain rod (21) is rotatably connected to the moving base (5) through a second support disc (28). The symmetrical three-axial parallel spindle head not only can enable the tool to achieve multi-directional fixed-point rotation around any point within a certain range of the internal space of the moving and fixed platforms merely by the parallel spindle head structure itself, but also can achieve multi-directional fixed-point rotation around the tool tip point; and the spindle head structure is symmetrical, and the motion characteristic is also symmetrical.

7 Claims, 3 Drawing Sheets

(58) Field of Classification Search
CPC . Y10T 409/308232; Y10T 409/308512; Y10T 409/309576; B25J 9/003–9/0078
USPC ......... 74/490.01–490.11; 409/201, 211, 216, 409/235
See application file for complete search history.

(56) References Cited

U.S. PATENT DOCUMENTS

| | | | | |
|---|---|---|---|---|
| 6,540,458 | B1 * | 4/2003 | Ponisch | B23Q 1/5462 |
| | | | | 414/733 |
| 6,682,278 | B2 * | 1/2004 | Gronbach | B23Q 1/015 |
| | | | | 409/137 |
| 6,808,344 | B2 * | 10/2004 | Chen | B25J 9/0069 |
| | | | | 409/235 |
| 7,047,833 | B2 * | 5/2006 | Durschmied | F16H 25/20 |
| | | | | 74/89.32 |
| 7,101,129 | B2 * | 9/2006 | Gronbach | B23Q 1/015 |
| | | | | 409/137 |
| 7,357,049 | B2 * | 4/2008 | Hermoso | B23Q 1/012 |
| | | | | 74/490.09 |
| 7,938,602 | B2 * | 5/2011 | Ota | B25J 9/1623 |
| | | | | 409/235 |
| 9,199,381 | B2 * | 12/2015 | Neumann | B23C 1/12 |
| 11,583,966 | B2 * | 2/2023 | Liu | B23Q 1/522 |
| 2007/0137476 | A1 * | 6/2007 | Neumann | B25J 9/006 |
| | | | | 91/506 |
| 2008/0193241 | A1 * | 8/2008 | Huang | B25J 17/0266 |
| | | | | 409/211 |
| 2009/0205457 | A1 * | 8/2009 | Neumann | B25J 17/0266 |
| | | | | 409/235 |
| 2015/0183072 | A1 | 7/2015 | Wang et al. | |
| 2017/0113356 | A1 * | 4/2017 | Huang | B25J 17/0266 |

FOREIGN PATENT DOCUMENTS

| | | | |
|---|---|---|---|
| CN | 101049692 A | * | 10/2007 |
| CN | 101264576 A | | 9/2008 |
| CN | 101323089 A | | 12/2008 |
| CN | 102490177 A | | 6/2012 |
| CN | 102699898 A | * | 10/2012 |
| CN | 105690361 A | * | 6/2016 |
| CN | 111604883 A | * | 9/2020 |
| DE | 19920940 A1 | * | 11/2000 |
| DE | 10256302 A1 | * | 6/2004 |
| GB | 2083795 A | * | 3/1982 |
| JP | 10-138090 A | * | 5/1998 |
| JP | 11-010575 A | * | 1/1999 |
| JP | 2000-110905 A | * | 4/2000 |
| WO | WO-01/32355 A1 | * | 5/2001 |
| WO | WO-2005/025816 A1 | * | 3/2005 |
| WO | WO-2006/062466 A1 | * | 6/2006 |

OTHER PUBLICATIONS

Machine Translation of JP 2000-110905 A, which JP '905 was published Apr. 2000.*

* cited by examiner

SYMMETRICAL THREE-AXIS PARALLEL SPINDLE HEAD CAPABLE OF MULTI-DIRECTIONAL FIXED-POINT ROTATION

TECHNICAL FIELD

The present invention relates to the technical field of CNC (Computer Numerical Control) machine tool equipment, and in particular to a symmetrical three-axis parallel spindle head capable of multi-directional fixed-point rotation.

BACKGROUND OF THE INVENTION

In order to obtain an integral structural part with superior performance, it is desirable to cut the metal from an integral blank. However, for structural parts with complex shapes, large material removal rate and easy deformation of thin walls, such as large-scale aviation structural parts and the like, the conventional tandem spindle head is difficult to meet the requirements of machining precision, quality and machining efficiency of parts at the same time.

The parallel spindle head has the advantages of high rigidity to mass ratio, high dynamic performance and high precision compared with a tandem spindle head, and is increasingly used in advanced equipment manufacturing. Among them, the three-axis parallel spindle head with two degrees of freedom of rotation and one degree of freedom of movement has a good application prospect in the field of high-speed CNC machine tool equipment. The three-axis parallel spindle head can be conveniently matched with the two-axis moving platform to realize five-axis simultaneous machining, which greatly improves the machining efficiency while ensuring the machining precision and quality.

However, typical parallel spindle head structures, such as patent CN1843709A, patent CN101049699A, patent CN101691013A, and patent CN102626870A, cannot achieve multi-directional fixed-point rotation of the tool merely by the parallel spindle head structure itself, and need to be compensated in real time by control means and the movement of the additional shaft, which makes it difficult for the position calibration and trajectory planning of the tool head. The precision and dynamic response speed of the spindle head are restricted to a certain extent. The patent CN101497167A can achieve fixed-point rotation of the tool merely by the parallel spindle head structure itself, the motion characteristics thereof are not symmetrical due to the fact that the structure is not symmetrical. The rotating center of the existing parallel spindle head rotation platform cannot coincide with the tool tip point, multi-directional fixed-point rotation around the tool tip point cannot be achieved, which makes it more difficult to realize multi-axis simultaneous machining.

SUMMARY OF THE INVENTION

The present invention aims to provide a symmetrical three-axis parallel spindle head capable of multi-directional fixed-point rotation so as to solve the problems existing in the prior art, not only to enable the tool to achieve multi-directional fixed-point rotation around any point within a certain range of the internal space of the moving and fixed platforms merely by the parallel spindle head structure itself, but also to achieve multi-directional fixed-point rotation around the tool tip point; and the spindle head structure is symmetrical, and the motion characteristic is also symmetrical.

To achieve the above purpose, the present invention provides the following solutions: the present invention provides a symmetrical three-axis parallel spindle head capable of multi-directional fixed-point rotation, comprising three branch chains with same structure axisymmetrically with 120° in space, a moving base connected with one end of the three branch chains and a fixed base connected with main bodies of the three branch chains; wherein a machining spindle is fixedly connected to the moving base; the branch chain comprises a servo motor, a branch chain rod, a lead screw and a guide nut, and a lead screw and a linear guide rail are provided in an inner cavity of one end of the branch chain rod; one end of the lead screw is connected with the servo motor; the lead screw passes through the guide nut; the other end of the lead screw is connected with the branch chain rod through a rotating pair; the servo motor and the lead screw provide a degree of freedom of movement between the branch chain rod and the guide nut; the guide nut is mounted on the linear guide rail and is rotatably connected with the fixed base through a first support disc, the other end of the branch chain rod is rotationally connected with the moving base through a second support disc.

Preferably, the positions, connected with the moving base and the fixed base, of the branch chain are respectively provided with a moving base bearing and a fixed base bearing; the first support disc is connected with an inner ring of the fixed base bearing, an outer ring of the fixed base bearing is fixedly connected with the fixed base, the second support disc is connected with an inner ring of the moving base bearing, and an outer ring of the moving base bearing is fixedly connected with the moving base.

Preferably, an included angle exists between a rotation axis of the fixed base bearing and an end face of the fixed base, and a same included angle exists between a rotation axis of the moving base bearing and an end face of the moving base on the same branch chain.

Preferably, the rotation axis of the fixed base bearing and the rotation axis of the moving base bearing intersect at one point in space; three intersections of rotation axes of base bearings of the three branch chains determine a plane.

Preferably, the other end of the lead screw is connected with an inner cavity wall of the branch chain rod through a rotating pair.

Preferably, four linear guide rail are provided, which are fixed respectively at four corners of an inner cavity of the branch chain rod, the guide nut is mounted on the linear guide rail, and the guide nut and the linear guide rail form a moving pair.

Preferably, the guide nut is connected with the first support disc through a rotating pair composed of a pin shaft and a bearing, and the other end of the branch chain rod is connected with the second support disc through a rotary hinge.

Preferably, an axis of a rotating pair composed of the guiding nut and the first support disc is parallel to an axis of a rotating pair composed of the branch chain rod and the second support disc.

Preferably, the servo motor in the branch chain is replaceable by a linear motor, which provides a degree of freedom of movement between the branch chain rod and the guide nut.

The present invention achieves the following technical effects relative to the prior art:

The symmetrical three-axis parallel spindle head capable of multi-directional fixed-point rotation of the present invention is capable of multi-directional fixed-point rotation of the tool around any point in a certain range of space merely by the parallel spindle head structure itself, and is also capable of fixed-point rotation around the tool tip point; it is easy to calibrate and control, and trajectory planning and precision improvement are facilitated; the structure is symmetrical, and the motion characteristics are also symmetrical.

BRIEF DESCRIPTION OF THE DRAWINGS

In order to more clearly illustrate the technical solutions in the embodiments of the present invention or the prior art, the drawings used in the embodiments are briefly described below. It is clear that the drawings in the following description are merely some embodiments of the present invention, and other drawings may be obtained according to these drawings without any inventive effort for a person skill in the art.

Figure 1:
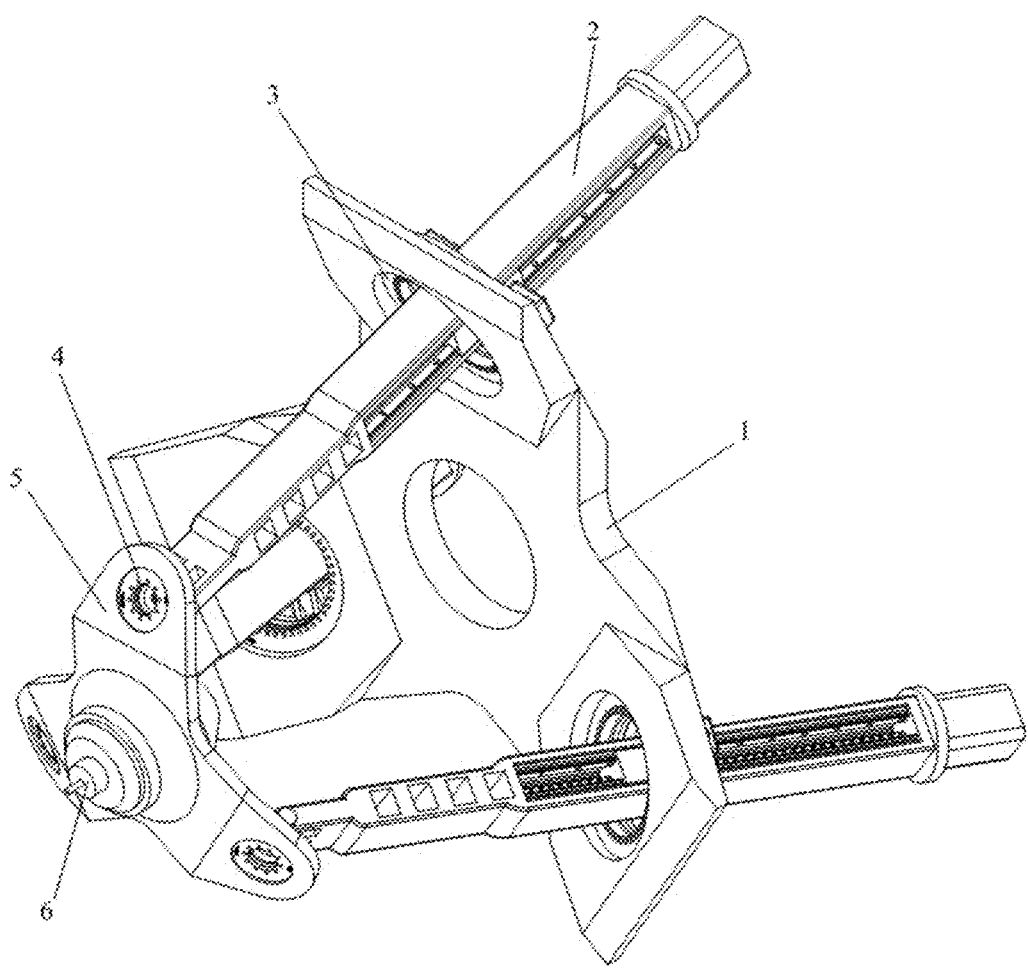
FIG. 1 is a schematic isometric view of an overall structure of the present invention.

In the drawings: 1—fixed base; 2—branch chain; 3—fixed base bearing; 4—moving base bearing; 5—moving base; 6—machining spindle; 21—branch chain rod; 22—servo motor; 23—lead screw; 24—linear guide rail; 25—guide nut; 26—first support disc; 27—rotary hinge; 28—second support disc.

DETAILED DESCRIPTION OF THE PREFERRED EMBODIMENTS

The technical solutions in the embodiments of the present invention will be clearly and completely described in connection with the accompanying drawings in the embodiments of the present invention, and it is clear that the described embodiments are merely a part of the embodiments of the present invention, and not all of them. Based on the embodiments of the present invention, all other embodiments obtained by a person of ordinary skill in the art without making creative labor fall within the scope of protection of the present invention.

The present invention aims to provide a symmetrical three-axis parallel spindle head capable of multi-directional fixed-point rotation so as to solve the problems existing in the prior art, not only to enable the tool to achieve multi-directional fixed-point rotation around any point within a certain range of the internal space of the moving and fixed platforms merely by the parallel spindle head structure itself, but also to achieve multi-directional fixed-point rotation around the tool tip point; and the spindle head structure is symmetrical, and the motion characteristic is also symmetrical.

The symmetrical three-axis parallel spindle head capable of multi-directional fixed-point rotation of the present invention comprises three branch chains with the same structure arranged axisymmetrically with 120° in space, a moving base connected with one end of the three branch chains and a fixed base connected with the main bodies of the three branch chains, and the machining spindle is fixedly connected to the moving base; the branch chain comprises a servo motor, a branch chain rod, a lead screw and a guide nut, and a lead screw and a linear guide rail are provided in the inner cavity of one end of the branch chain rod; one end of the lead screw is connected with the servo motor; the lead screw passes through the guide nut; the other end of the lead screw is connected with the branch chain rod through a rotating pair; the guide nut is mounted on the linear guide rail and is rotationally connected with the fixed base through the first support disc, and the other end of the branch chain rod is rotatably connected with the moving base through the second support disc.

In order to make the above-mentioned objects, features and advantages of the present invention more comprehensible, a further detailed description of the present invention is provided below in conjunction with the accompanying drawings and detailed description.

Figure 2:
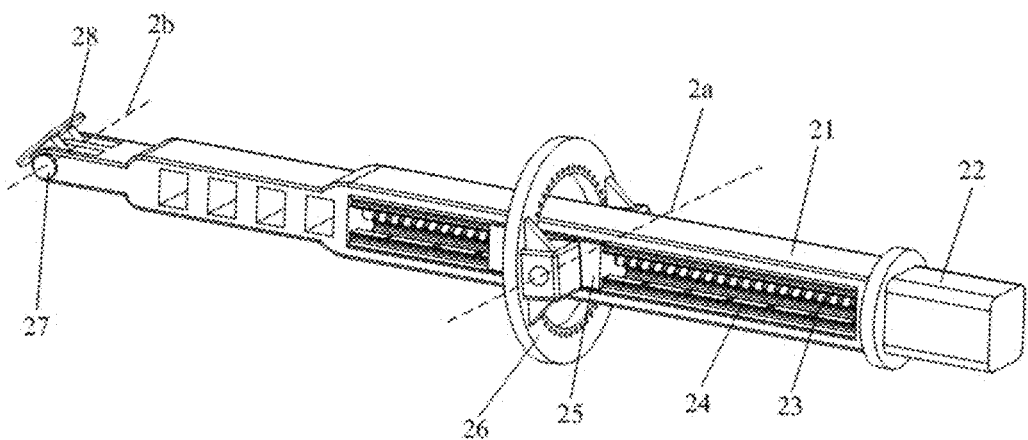
FIG. 2 is a schematic structural view of a branch chain of the present invention.
Figure 3:
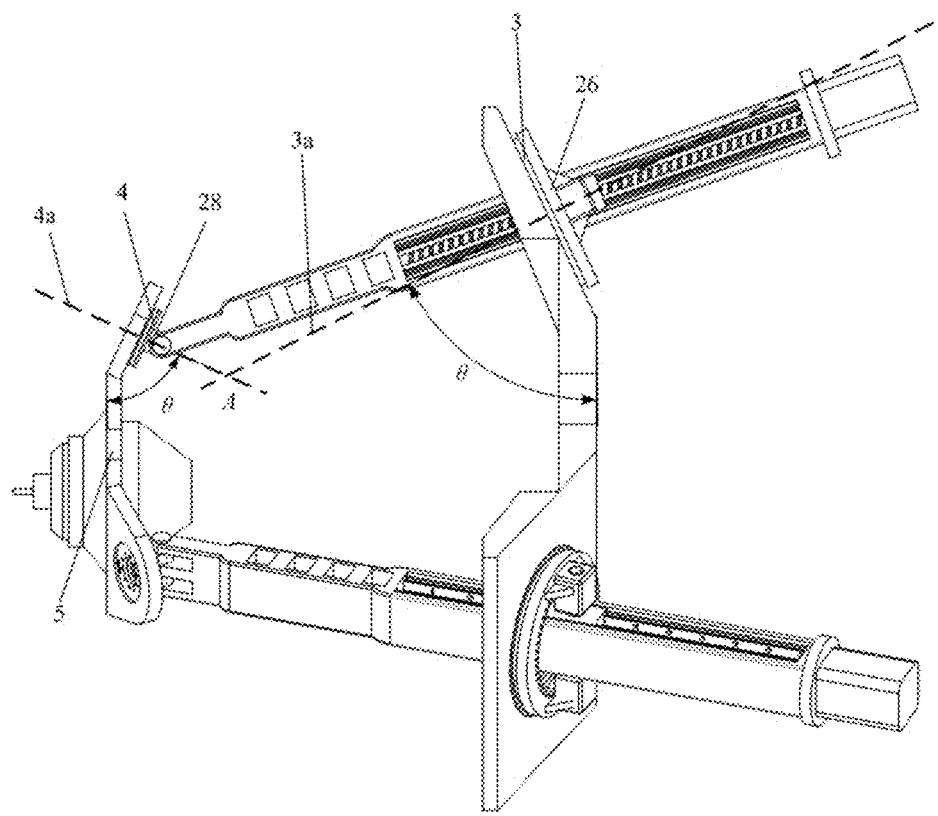
FIG. 3 is a schematic side view of the overall structure of the present invention.
Figure 4:
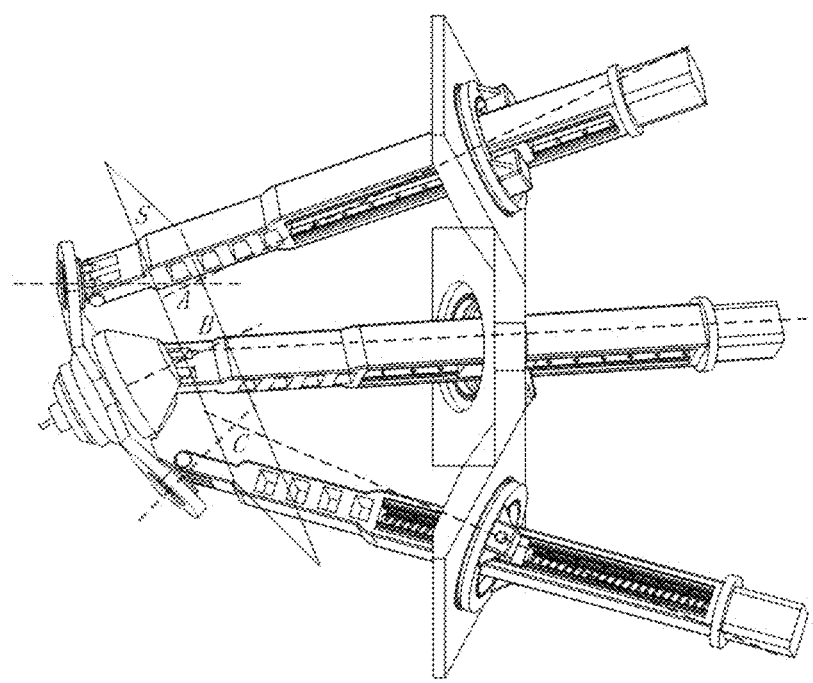
FIG. 4 is a schematic view of the movement of the present invention.

Please refer to FIGS. 1-4, wherein FIG. 1 is a schematic isometric view of an overall structure of the present invention; FIG. 2 is a schematic structural view of a branch chain of the present invention; FIG. 3 is a schematic side view of the overall structure of the present invention; FIG. 4 is a schematic view of the movement of the present invention.

As shown in FIGS. 1-4, the present invention provides a symmetrical three-axis parallel spindle head capable of multi-directional fixed-point rotation. which comprises a fixed base 1, a moving base 5, a machining spindle 6 fixedly connected to the moving base 5, three branch chains 2 with the same structure arranged axisymmetrically with 120° in space between the fixed base 1 and the moving base 5, and the branch chains 2 connects the fixed base bearing 3 of the fixed base 1 and the moving base bearing 4 of the moving base 5 respectively.

As shown in FIG. 2, the branch chain 2 is composed of a branch chain rod 21, a servo motor 22, a lead screw 23, a linear guide rail 24, a guide nut 25, a first support disc 26, a rotary hinge 27 and a second support disc 28; the servo motor 22 is fixedly connected to one end of the branch chain rod 21; one end of the lead screw 23 is connected with the servo motor 22 and is driven by the servo motor 22; the servo motor 22 and the lead screw 23 provide a degree of freedom of movement between the branch chain rod 21 and the guide nut 25; the lead screw 23 passes through the guide nut 25; and the other end of the lead screw 23 is connected with the other end of the branch chain rod 21 through a rotating pair. Four linear guide rail 24 are provided, which are fixed respectively at the four corners of the square inner cavity of the branch chain rod 21. The guide nut 25 is mounted on the linear guide rail 24 in the square inner cavity of the branch chain rod 21, the guide nut 25 and the linear guide rail 24 form a moving pair, the guide nut 25 is connected with the first support disc 26 through a rotating pair composed of a pin shaft and a bearing or other equivalent structure, the axis of the rotating pair is 2a. The branch chain rod 21 and the second support disc 28 are connected through a rotary hinge 27, the branch chain rod 21 and the second support disc 28 form a rotating pair with the axis 2b, and the axis 2a of the rotating pair and the axis 2b of the rotating pair are parallel to each other.

As shown in FIG. 3, one end of the branch chain 2 is connected with the inner ring of the fixed base bearing 3 through the first support disc 26, and the outer ring of the fixed base bearing 3 is fixedly connected with the fixed base 1, and the rotation axis of the fixed base bearing 3 is 3a, and the other end of the branch chain 2 is connected with the inner ring of the moving base bearing 4 through a second support disc 28. The outer ring of the moving base bearing 4 is fixedly connected to the moving base 5, the rotation axis of the moving base bearing 4 is 4a. An included angle θ is formed between the rotation axis 3a of the fixed base bearing 3 and the end face of the fixed base 1, the included angle between the rotation axis 4a of the moving base bearing 4 and the end face of the moving base 5 is also θ, and the rotation axis 3a of the fixed base bearing 3 and the rotation axis 4a of the moving base bearing 4 intersect at a point A in space.

As shown in FIG. 4, and the other two branch chains 2 are respectively connected with the fixed base 1 and the moving base 5 in the same way as the above-mentioned branch chain 2 is connected with the fixed base 1 and the moving base 5 respectively, and the intersections B and C of the other two bearing rotation axes can also be obtained. The three intersections A, B, and C of the bearing rotation axes define a plane S. When each branch chain 2 is driven by the servo motor 22, the moving base 5 and the machining spindle 6 fixedly connected to the moving base 5 can realize multi-directional fixed-point rotation around any point in the plane S, which belongs to two degrees of freedom of rotation, and realize movement perpendicular to the plane, which belongs to one degree of freedom of movement.

Figure 5:
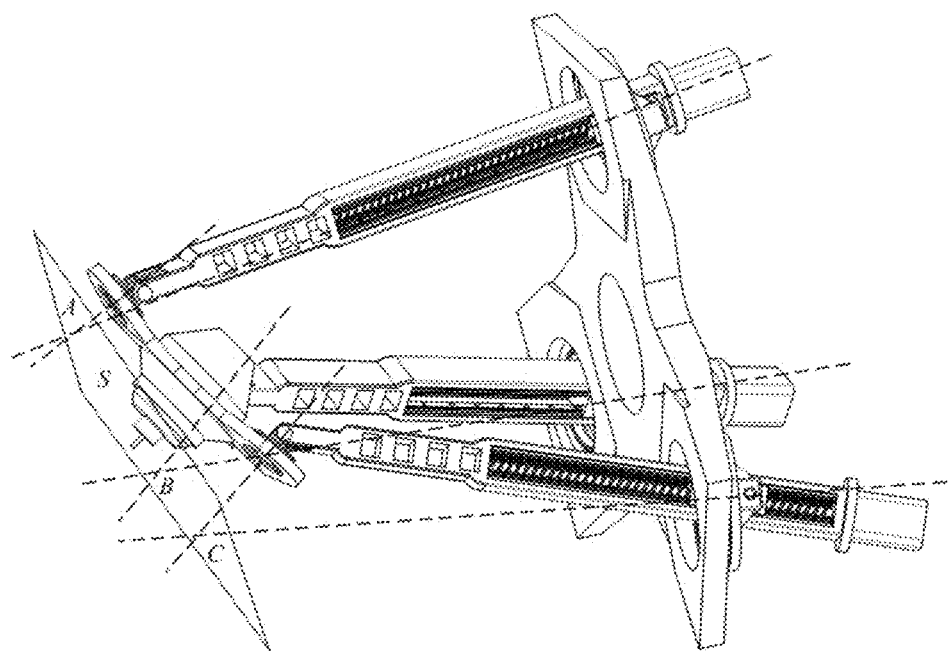
FIG. 5 is a schematic view of rotation around a tool tip point according to the present invention.

As shown in FIG. 5, it is possible to control the position and attitude of the plane S defined by the three intersections A, B, and C of the bearing rotation axes by merely changing the dimensions of the mechanism and controlling the lengths of the moving pairs in the three branch chains 2 without changing the connection relationship and geometric relationship of the above-mentioned components, and it is possible to realize the function of multi-directional fixed-point rotation around the tool tip point merely by relying on the parallel spindle head itself when the tool tip point on the machining spindle 6 is exactly located on the above-mentioned plane S.

The driving device in the embodiment adopts the form of a structure in which the servo motor 22 drives the lead screw 23 to provide a degree of freedom of movement between the branch chain rod 21 and the guide nut 25. In order to achieve the same purpose, a linear motor driving mode can also be adopted, a degree of freedom of movement is provided between the branch chain rod 21 and the guide nut 25. In a specific implementation, any other structure capable of achieving the same motion function can be used as a driving mode. Meanwhile, the present invention allows the fixed base 1 to be connected with the two orthogonal moving platforms, which in turn constitute a five-axis CNC machine tool machining unit.

In the present invention, specific embodiments are used to illustrate the principles and implementation of the present invention. The description of the above embodiments is only used for helping to understand the method of the present invention and the core idea of the method; and meanwhile, for a person skilled in the art, according to the idea of the present invention, there will be changes in the specific implementation and application scope based on the ideas of the invention. In summary, the content of this specification should not be understood as a limitation on the present invention.

What is claimed is:

1. A symmetrical three-axis parallel spindle head capable of multi-directional fixed-point rotation, the spindle head comprising:
    three branch chains, each of the branch chains having the same structure and being spaced axisymmetrically about an axis with 120° spacing between adjacent ones of the branch chains;
    a moving base connected with a corresponding one end of each of the three branch chains; and
    a fixed base connected with a respective main body of each of the three branch chains;
    wherein a machining spindle is fixedly connected to the moving base;
    wherein each of the branch chains comprises:
        a respective servo motor,
        a respective branch chain rod,
        a respective lead screw, and
        a respective guide nut, and
    wherein for each of the branch chains:
        a respective one of the lead screws and a respective linear guide rail are provided in a respective inner cavity of a respective first end of the corresponding branch chain rod;
        a respective first end of the corresponding lead screw is connected with the corresponding servo motor;
        the corresponding lead screw passes through the corresponding guide nut;
        a respective second end of the corresponding lead screw is connected with the corresponding branch chain rod via a respective rotating pair;
        the corresponding servo motor and the corresponding lead screw provide a degree of freedom of movement between the corresponding branch chain rod and the corresponding guide nut;
        the corresponding guide nut is mounted on the corresponding linear guide rail and is rotatably connected with the fixed base via a first support disc,
        a corresponding second end of the corresponding branch chain rod is rotationally connected with the moving base via a second support disc;
    wherein each of the branch chains is connected to the fixed base via a respective fixed base bearing such that each of the first support discs is connected with a respective inner ring of the corresponding fixed base bearing, and such that a respective outer ring of the corresponding fixed base bearing is fixedly connected with the fixed base;
    wherein each of the branch chains is connected to the moving base via a respective moving base bearing such that each of the second support discs is connected with a respective inner ring of the corresponding moving base bearing, and such that a respective outer ring of the corresponding moving base bearing is fixedly connected with the moving base;
    wherein a respective rotation axis of each of the fixed base bearings intersects at a respective one intersection point in space with a respective rotation axis of each of the moving base bearings, such that there is one respective such intersection point for each of the three branch chains, and wherein the three intersection points of the three branch chains determine a plane.

2. The symmetrical three-axis parallel spindle head capable of multi-directional fixed-point rotation, according to claim 1, wherein each of the rotation axes of each of the fixed base bearings forms a respective included angle with an end face of the fixed base, and wherein each of the rotation axes of each of the moving base bearings forms a respective included angle with an end face of the moving base.

3. The symmetrical three-axis parallel spindle head capable of multi-directional fixed point rotation according to claim 2, wherein the included angles between the rotation axes of the fixed base bearings and the end face of the fixed base have the same value as the included angles between the rotation axes of the moving base bearings and the end face of the moving base.

4. The symmetrical three-axis parallel spindle head capable of multi-directional fixed-point rotation according to claim 1, wherein for each of the branch chains, the corresponding second end of the corresponding lead screw is connected with a respective inner cavity wall of the corresponding branch chain rod via a respective rotating pair.

5. The symmetrical three-axis parallel spindle head capable of multi-directional fixed-point rotation according to claim 1, wherein for each of the branch chains, an additional respective three linear guide rails are provided, such that each of the branch chains comprises a respective four linear guide rails, wherein for each of the branch chains:
   the corresponding four linear guides rails are each fixed at a respective one of four corners of the respective inner cavity of the respective branch chain rod;
   the corresponding guide nut is mounted on the corresponding four linear guide rails; and
   the corresponding guide nut and the corresponding four linear guide rails form a respective moving pair.

6. The symmetrical three-axis parallel spindle head capable of multi-directional fixed-point rotation according to claim 5, wherein each of the guide nuts is connected with a respective one of the first support discs via a respective second rotating pair composed of a respective pin shaft and a respective bearing, and wherein the respective second ends of each of the branch chain rods are each connected with the corresponding second support disc via a respective rotary hinge.

7. The symmetrical three-axis parallel spindle head capable of multi-directional fixed-point rotation according to claim 6, wherein for each of the branch chains, a respective axis of the corresponding second rotating pair is parallel to a respective axis of the respective rotary hinge.

* * * * *